United States Patent
Coste et al.

(10) Patent No.: US 7,023,489 B2
(45) Date of Patent: Apr. 4, 2006

(54) METHOD AND DEVICE FOR DETECTING THE PARITY OF SUCCESSIVE FIELDS OF AN INTERLACED VIDEO SIGNAL

(75) Inventors: Diego Coste, Varces (FR); Ilija Materic, Grenoble (FR); François Besson, Meylan (FR); Hervé Maffini, Saint-Martin d'Hères (FR)

(73) Assignee: STMicroelectronics S.A., Montrouge (FR)

( * ) Notice: Subject to any disclaimer, the term of this patent is extended or adjusted under 35 U.S.C. 154(b) by 546 days.

(21) Appl. No.: 10/283,029

(22) Filed: Oct. 29, 2002

(65) Prior Publication Data

US 2003/0081148 A1    May 1, 2003

(30) Foreign Application Priority Data

Oct. 30, 2001  (FR) .................................. 01 14058

(51) Int. Cl.
*H04N 5/08*  (2006.01)
(52) U.S. Cl. ........................ 348/526; 348/533
(58) Field of Classification Search ................ 348/526, 348/527, 558, 542, 550, 525, 533; 386/66, 386/116
See application file for complete search history.

(56) References Cited

U.S. PATENT DOCUMENTS

| | | | | |
|---|---|---|---|---|
| 4,553,185 A | * | 11/1985 | Poole | 386/66 |
| 4,575,770 A | * | 3/1986 | Dieterich | 386/116 |
| 4,683,495 A | * | 7/1987 | Brock | 348/526 |
| 4,827,341 A | * | 5/1989 | Akimoto et al. | 348/526 |
| 4,858,008 A | * | 8/1989 | Sieben et al. | 348/526 |
| 5,008,751 A | | 4/1991 | Wischermann | 358/148 |
| 5,327,175 A | | 7/1994 | Kim | 348/526 |
| 5,473,387 A | | 12/1995 | Okada et al. | 348/526 |
| 5,619,275 A | * | 4/1997 | Tults | 348/526 |
| 5,877,816 A | * | 3/1999 | Kim | 348/526 |
| 5,955,618 A | * | 9/1999 | Kim | 548/471 |

FOREIGN PATENT DOCUMENTS

| | | |
|---|---|---|
| EP | 0455957 | 11/1991 |
| EP | 0478385 | 4/1992 |

* cited by examiner

*Primary Examiner*—Victor R. Kostak
(74) *Attorney, Agent, or Firm*—Lisa K. Jorgenson; Allen, Dyer, Doppelt, Milbrath & Gilchrist, P.A.

(57) ABSTRACT

Successive values of a horizontal phase of a video signal are determined a predetermined integer number of video lines after the successive occurrences of vertical synchronization pulses. The successive values of a parity bit are updated according to the successive values of the horizontal phase. Indications on the parity of the fields are provided from the successive values of the parity bit.

27 Claims, 4 Drawing Sheets

METHOD AND DEVICE FOR DETECTING THE PARITY OF SUCCESSIVE FIELDS OF AN INTERLACED VIDEO SIGNAL

FIELD OF THE INVENTION

The present invention relates to the processing of interlaced video signals, and more particularly, to detecting the parity of successive fields of a video signal.

BACKGROUND OF THE INVENTION

The parity of the fields of a video signal enables lines to be interlaced when displayed. Hence, line 1 starts at the top left of the screen and line 313 (for a scanning frequency of 50 Hz) or line 266.5 (for a scanning frequency of 60 Hz) starts at the top center of the screen. Furthermore, the parity of the fields changes at each field for an interlaced signal.

In analog circuits, the parity is naturally managed by the position of vertical synchronization pulses, which occur either at the start of the line or at the center of the line. It is therefore not necessary to make the parity explicit, since the vertical synchronization signal directly triggers the return of the spot to the top of the screen.

But it now seems to be necessary to transcribe the conventional analog video stream to a digital stream similar to that provided by the new image sources, such as DVD and digital terrestrial broadcast via cable or via satellite. This would result in an extension of the features offered by television sets, such as improved integration which generates savings.

However, according to the standard governing this digital transcription of video images, vertical synchronization is no longer provided in the same way. Flipping of a bit representing the parity causes the spot to be returned to the top of the screen. Thus, at a scanning frequency of 50 Hz (PAL and SECAM systems) this parity bit has the value 0 for lines 1 to 312 and 1 for lines 313 to 625. For a scanning frequency of 60 Hz (NTSC system in particular) this bit has the value 0 for lines 4 to 265 and 1 for lines 266 to 3.

It is therefore important to express the parity very accurately. The positions of the vertical synchronization pulses thus assume less importance. This is because if there is an error in the parity of a field, the parity bit will not flip between this field and the previous and following fields. This failure to flip may turn out to be very detrimental since it directly affects the operation of the digital signal receivers, which then start to search for the flip. This gives rise to an image which appears to turn over on the screen, i.e., rapid vertical movement.

However, this determination is particularly difficult for noisy signals and signals from video tape recorders. In the former case, there are sufficiently distorted vertical synchronization pulses which cause the instant at which the presence of this vertical synchronization is determined to change. The parity depends only on the position of the vertical synchronization with respect to the horizontal phase. This results in a significant risk of error.

For video tape recorders the problem is the reverse. Since the signals do not generally present much noise, the position of the vertical synchronization is well determined. However, the phase of the phase-locked loop relative to the video signal may have been greatly distorted due to the presence of phase jumps a few lines before the appearance of the vertical synchronization. In these conditions, the relation between the horizontal phase and the vertical synchronization pulse is then again distorted, and there is a risk of the parity inverting.

SUMMARY OF THE INVENTION

In view of the foregoing background, an object of the present invention is to improve the detection of the parity in the digital transmission of video signals.

This and other objects, advantages and features in accordance with the present invention are provided by a method for detecting the parity of successive fields of an interlaced video signal, in which the successive values of the horizontal phase of the signal are respectively determined a predetermined integer number n of video lines after the successive occurrences of vertical synchronization pulses. Moreover, the successive values of a parity bit are updated according to the successive values of the horizontal phase, and the indications on the parity of the fields are provided from the successive values of the parity bit.

In other words, the horizontal phase is taken not at the instant of the vertical synchronization pulse, but a certain integer number of lines later. This number n should be sufficient for the phase-locked loop to be able to re-establish a correct horizontal phase relation with the input signal. The comparison then recovers all the reliability that it had lost due to a possible end-of-field phase jump which may happen, in particular, when the source of the video signal is a video tape recorder.

However, this predetermined integer number n of lines should not be too high. If the video source is a video tape recorder and if the video tape recorder is not in a normal play mode, then, in addition to the routine end-of-field phase jump, several other phase jumps can occur spaced a few tens of lines. This risks changing the phase again before it has been registered. A person skilled in the art knows how to adjust the number n according to these applications. For example, a number n between about 10 and about 50 can be chosen, such as 16 or 32.

According to a preferred implementation of the invention, enabling in particular the case of noisy signals to be better taken into account, an arbitrary parity bit is used which is a binary signal flipping at each start of the field. More specifically, according to this form of implementation, the current value of the arbitrary parity bit is changed on each occurrence of a vertical synchronization pulse. The current value of the arbitrary parity bit is compared with the value of the parity bit determined at the previous field, and the value of a signed parity counter is incremented or decremented according to the comparison. This counter had initially been set to zero, for example.

Moreover, the indication of the parity of the current field is the current value of the arbitrary parity bit, or the complement of the current value of this arbitrary parity bit according to the sign of the current value of the parity counter. A positive counting-stop value and a negative counting-stop value can be fixed for the parity counter. Thus, when the parity counter reaches its negative counting-stop value, a new decrement command results in the counter value not being modified. Likewise, when the counter reaches its positive counting-stop value, a new increment command results in the value of the counter not being modified.

Thus, according to this form of implementation, at the output much more reliable values for the parity are obtained than those directly arising from the detection, particularly in the case of noisy signals. This is because the detection need only be wrong less than one in two times for the counter to approach one of these stops and to never change sign, which leads to the disappearance of errors at the output.

Moreover, the value of the counter is advantageously reset to 0 on each loss of vertical synchronization. Furthermore, the first detection which follows the return of the vertical synchronization will then bring the counter back to 1 or −1, which results in an immediate response from the point of view of the sign.

Moreover, initially setting the signed parity counter to 0 contributes practically no inertia to the system on startup compared to initially setting the counter to a high value which, if it were to turn out that it did not correspond to the actual situation, would lead to waiting a certain number of cycles before the counter takes the correct sign. However, according to the invention, the inertia that is obtained when the counter has reached a stop value is an advantage for the reliability of the parity indication provided, even if detection suffers a few errors.

Another aspect of the present invention is directed to a device for detecting the parity of successive fields of an interlaced video signal. According to a general feature of the invention, the device comprises counting means for counting a predetermined integer number of video lines after each occurrence of a vertical synchronization pulse and for delivering an end-of-counting signal, and determination means for determining respectively the successive values of the horizontal phase of the signal upon successive deliveries of the end-of-counting signal. The device further comprises a first register containing a parity bit, updating means for updating the successive values of the parity bit according to the successive values of the horizontal phase, and processing means for providing indications on the parity of the fields from the successive values of the parity bit.

According to an embodiment of the present invention, the processing means comprise a signed parity counter which can be initially set to the value zero, a second register for containing an arbitrary parity bit, and means for changing the current value of the arbitrary parity bit at each occurrence of a vertical synchronization pulse. Comparison means compare the current value of the arbitrary parity bit with the value of the parity bit determined at the previous field. Control means increment or decrement the value of the parity counter according to the comparison. The parity indication of the current field is the current value of the arbitrary parity bit, or the complement of the current value of this arbitrary parity bit according to the sign of the current value of the parity counter.

According to an embodiment of the invention, the parity counter has a positive counting-stop value and a negative counting-stop value. When the counter reaches its negative counting-stop value, the control means do not modify the value of the counter when there is a new decrement command. When the counter reaches its positive counting-stop value, the control means do not modify the value of the counter when there is a new increment command.

The control means advantageously reset the value of the parity counter to 0 on each loss of vertical synchronization. Moreover, according to an embodiment of the invention, the counting means for counting the predetermined number of lines comprise a counter incremented in synch with a clock signal. The end-of-counting signal is delivered when the counter reaches a counting value corresponding to the product of the predetermined integer number n of video lines and the mean duration of a video line contained in the loop filter of a digital phase-locked loop used for the horizontal synchronization.

Another aspect of the present invention is directed to an integrated circuit comprising a detection device as described above.

BRIEF DESCRIPTION OF THE DRAWINGS

Other advantages and features of the invention will become apparent upon examination of the detailed description of the embodiments and forms of implementation, which are not in any way limiting, and of the appended drawings in which.

DETAILED DESCRIPTION OF THE PREFERRED EMBODIMENTS

Figure 1:
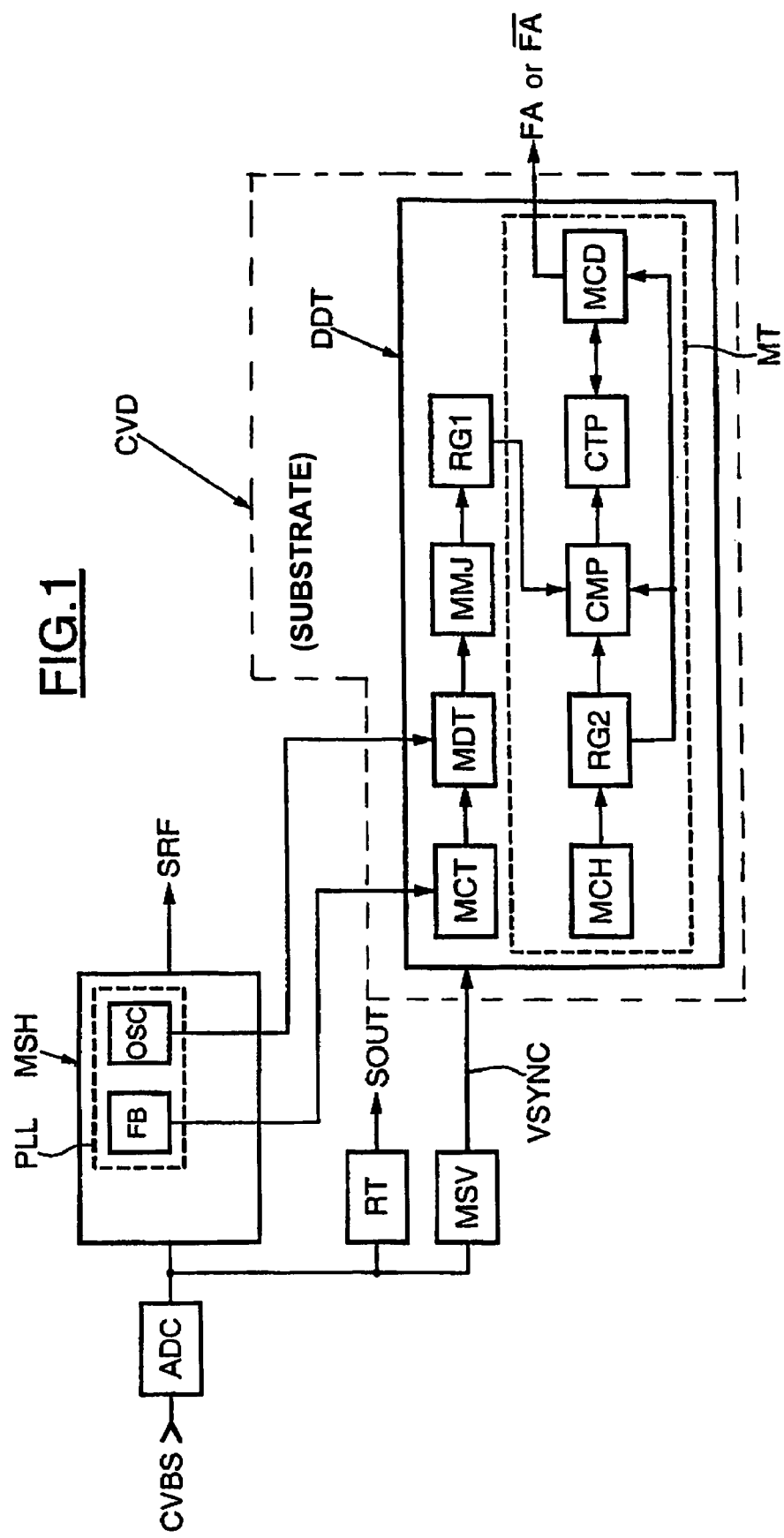
FIG. 1 is a schematic block diagram of a detection device according to the present invention.

In FIG. 1, the reference CVBS denotes an analog interlaced video signal from a video source. The video circuit CVD which receives the analog signal CVBS, and which can for example be implemented in the form of an integrated circuit on a silicon chip, comprises horizontal synchronization means MSH which can be of a known structure and operation. More specifically, the horizontal synchronization means comprise in particular a digital phase-locked loop PLL delivering a reference signal SRF from a controllable loop oscillator OSC. As is conventional in the art, this reference signal SRF is the output signal of the horizontal synchronization means MSH, and will be synchronized on the video signal. In other words, after synchronization and in the steady state, the transitions of the signal SRF correspond to horizontal synchronization pulses contained in the video signal.

The signal SRF is, moreover, fed back to the phase comparator of the loop PLL. The oscillator OSC is controlled via the loop filter FB (for example, a filter of the proportional-integral type) by an error signal representative of the phase gap between the digitized video signal CVBS and the signal SRF. The sampling frequency applied in the horizontal synchronization means MSH is on the order of 27 MHz, for example, and corresponds to a sampling clock in which the rising edges are spaced at intervals of 37 nanoseconds.

In this example, the oscillator OSC is then, for example, a cyclic counter incremented in synchronization with the sampling clock signal and in which the final nominal counting value is, for example, equal to 1727. This corresponds to a video line length of 64 microseconds. Of course, the final counting value of this cyclic counter can vary around the nominal value so as to be able to allow synchronization with the video signal CVBS.

In addition to the horizontal synchronization means MSH, the video circuit CVD comprises detection means DDT for detecting the parity of successive fields of the video signal. The detection means DDT, which will be examined in more detail later in terms of structure and function, receive in particular a signal VSYNC representative of the occurrence of a vertical synchronization pulse. This signal VSYNC is transmitted by vertical synchronization means MSV having a conventional structure. The vertical synchronization means MSV receive the video signal CVBS digitized after being passed through an analog-to-digital converter ADC.

Moreover, the reference SOUT denotes the video signal digitized and delayed by a delay corresponding to one video line after being passed through delaying means RT. This enables the delay in the generation of the signal VSYNC to be taken into account, and enables generation of the parity indication to coincide with the video output SOUT.

Figure 2:
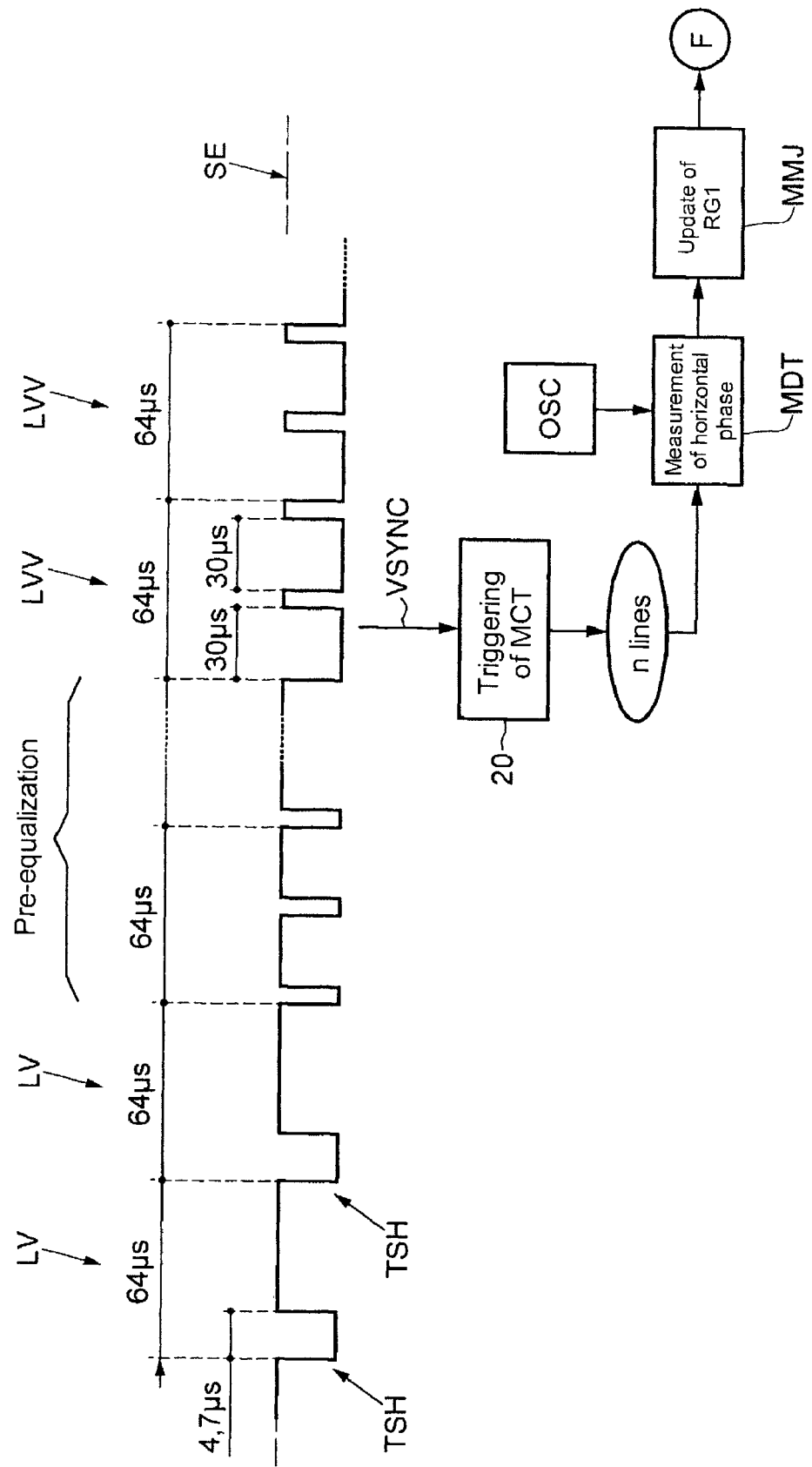
FIG. 2 shows a form of implementation for updating a parity bit from a delayed measure of the horizontal phase according to the present invention.

Reference will now also be made to FIG. 2 to describe the structure and operation of the detection means DDT. In the upper part of FIG. 2, several video lines of the video signal CVBS have been schematically represented. In the example described, all the video lines have a length of 64 microseconds.

More specifically, as is known to a person skilled in the art, the video lines can have different configurations. Thus, a video line LV, located for example in the middle of the field, starts with a horizontal synchronization pulse TSH. This pulse TSH extends for example over 4.7 microseconds and has a level less than the noise level SE.

Then, at the end of the field, the signal CVBS comprises a series of video lines forming a pre-equalization. The pulses of these video lines are shorter and greater in number than the pulses TSH. Then, the signal CVBS comprises several video lines LVV indicating the change of field. More specifically, each line LVV includes two pulses extending respectively over about 30 microseconds. Detection of these video lines LVV will enable the vertical synchronization means MSV to deliver the signal VSYNC.

From this instant onwards, counting means MCT will be triggered (step 20, FIG. 2). The counting means MCT will count a predetermined number n of video lines, such as 16 video lines, for example. In terms of hardware, the counting means MCT may comprise a counter incremented in synchronization with the sampling clock signal. The end-of-counting signal is delivered when the counter reaches a counting value corresponding to the product of the number n and the mean duration of a video line. This duration is for example contained in the loop filter FB of the digital phase-locked loop PLL.

When the counter has delivered its end-of-counting signal, determination means MDT will then determine the value of the horizontal phase of the video signal. To do this, the means MDT will examine the value of the cyclic counter forming the loop oscillator OSC to determine whether the horizontal phase lies between ¼ and ¾ or in the other half. More specifically, in this particular case, the means MDT will examine whether the value of the counter forming the oscillator OSC lies between 0 and ¼ of the counting limit or between ¾ of the counting limit and the counting limit, or between ¼ of the counting limit and ¾ of the counting limit of the other.

Depending on the result of this comparison, the updating means MMJ will update the value of a parity bit F contained in a first register RG1. More specifically, if the value of the counter lies between ¼ of the counting limit and ¾ of the counting limit, the value 1 for example will be assigned to the parity bit F and the value 0 otherwise.

Figure 3:
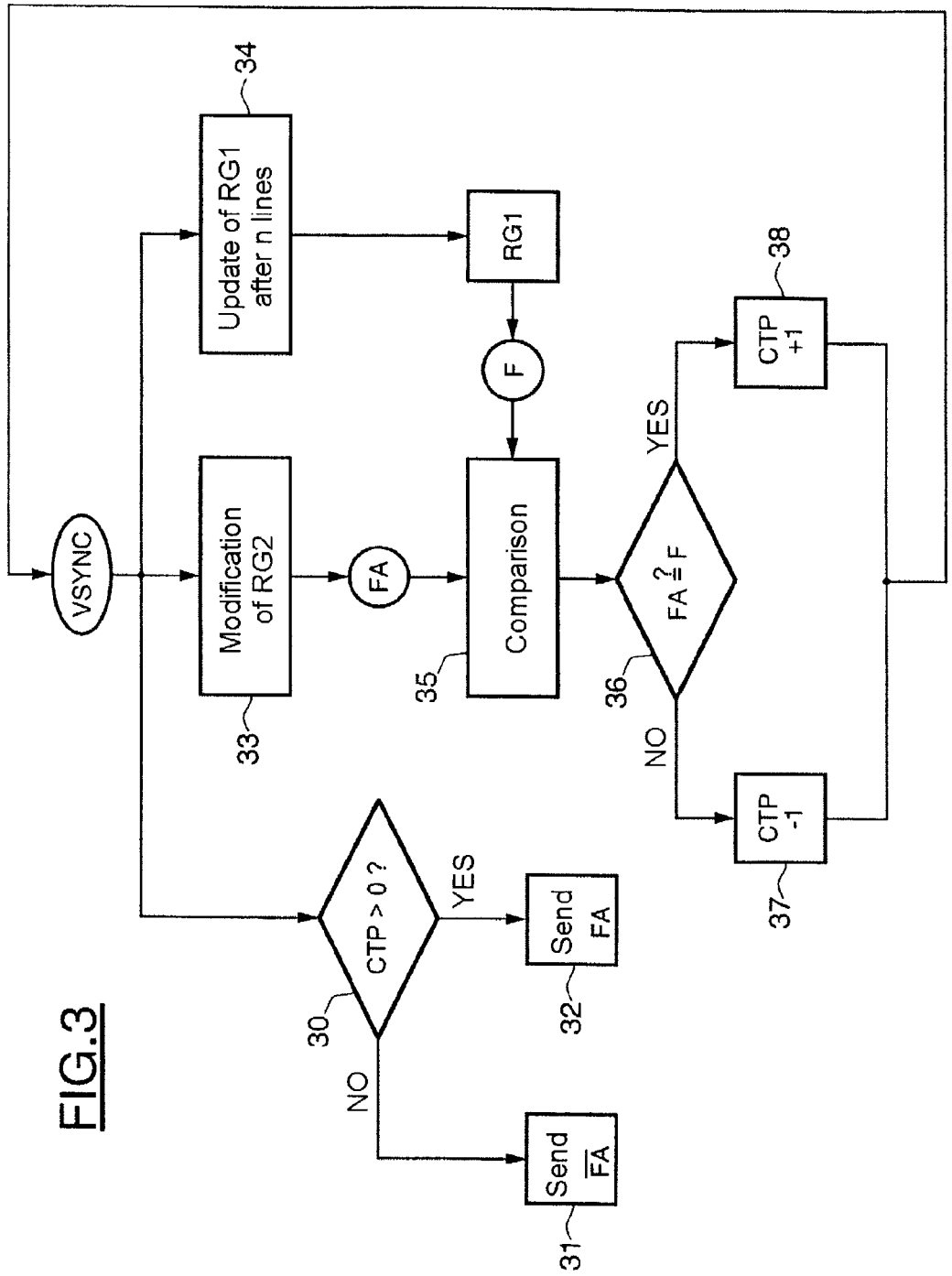
FIG. 3 is a flowchart for implementing the method according to the present invention.

Reference will now be made more particularly to FIG. 3 to describe a form of implementation of the method according to the invention enabling the delivery by processing means MT (FIG. 1) of an indication on the parity of the current field. Generally, this indication of the parity of the current field is the current value of an arbitrary parity bit FA or the complement $\overline{FA}$ of the current value of this arbitrary parity bit.

More specifically, control means MCD will deliver either the arbitrary parity bit FA (step 32) or the parity bit $\overline{FA}$ (step 31) depending on the sign of the content of a parity counter CTP. Thus, if the sign of the counter CTP is positive (step 30) it is the parity bit FA which is delivered. However if the sign of the counter is negative, it is the complement $\overline{FA}$ of the parity bit which is delivered.

Thus, as soon as the signal VSYNC appears, an indication of the parity of the current field is delivered. In parallel with this delivery, means MCH will modify (step 33) the value of the arbitrary parity bit FA contained in a second register RG2. This will be done for each occurrence of a new field, that is, on each occurrence of the signal VSYNC.

Comparison means CMP will then compare (step 35) the value of the arbitrary parity bit FA contained in the second register RG2 with the value of the parity bit F contained in the register RG1 and corresponding to the previous field. If the two parity bits FA and F are identical (step 36), the control means MCD will increment the parity counter CTP (step 38). Otherwise, the control means will decrement the counter CTP (step 37).

If the parity counter CTP has a positive stop value and a negative stop value, a command for a new increment when the counter CTP has reached its positive stop value results in this counter not being modified. A command for a new decrement when the counter CTP has reached its negative stop value also results in the counter not being modified.

In parallel with this updating of the value of the parity counter CTP, the first register RG1 is updated (step 34) after n video lines, as indicated above. At that moment, the first register RG1 contains the value of the parity bit F associated with the current field and which will be used for comparison with the parity bit FA during the next field.

In other words, according to the invention, at each new field, the value of bit FA is compared with the value of bit F associated with the previous field. If these two bits are identical, the counter CTP is incremented, otherwise it is decremented. This counter, which is initially set to 0, is also reset to 0 when vertical synchronization is lost.

When this counter CTP indicates positive values, this means that the arbitrary parity is in phase with the parity of the previous field, and inversely when the values are negative. The parity which is then sent to the digital stream at the output of the device DDT is no longer the detected parity but the arbitrary parity FA (if the counter is positive) or the inverse $\overline{FA}$ of this arbitrary parity (if the counter is negative). This arbitrary parity is more reliable than the detected parity.

The invention is not limited to the embodiments and forms of implementation which have just been described but covers all variations. Thus, the invention is compatible with a horizontal synchronization as described in French Patent Application No. 113,905.

Figure 4:
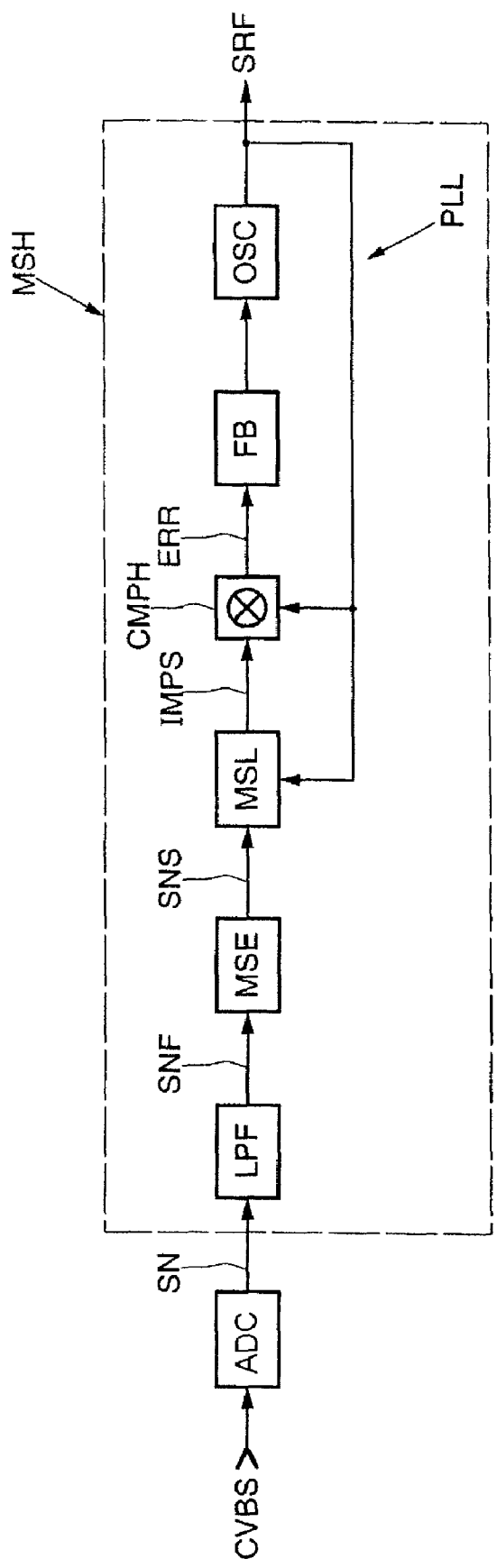
FIG. 4 schematically shows an embodiment of horizontal synchronization means which can be combined within the same video circuit with a parity management device according to the present invention.

More specifically, with reference to FIG. 4, detection of each horizontal synchronization pulse includes a sampling of the video signal, a low-pass filtering of the sampled signal SN, and a thresholding of the filtered signal SNF so as to leave only the pulses for which the level is less than a threshold. The detection further includes a selection, according to a predetermined selection criteria, among the residual pulses located inside an observation window centered on a transition of the reference signal of the pulse (IMPS) corresponding to the horizontal synchronization pulse.

In other words, according to this alternative form of implementation, all the pulses generated after thresholding are analyzed and they are ranked according to their level of likelihood. The pulse having the maximum likelihood is then selected to update the control of the loop oscillator.

Several selection criteria may be used. The selection criteria can include, for example, a dimension criteria in relation to a mean dimension (mean width) of a horizontal synchronization pulse. Thus, by way of indication, all the residual pulses for which the width is less than a predetermined percentage of the mean width of a horizontal synchronization pulse can be eliminated. After this elimination has been carried out, the residual pulse for which the width is closest to the mean width can then be selected, for example.

The selection criteria can include a position criteria in relation to the expected position of the horizontal synchronization pulse. More specifically, in this case, the expected position of the horizontal synchronization pulse is that of the transition of the reference signal. The temporal gap between each residual pulse and the transition of the reference signal is then determined, and the pulse which is attributed the smallest temporal gap is selected.

The selection criteria can combine the two abovementioned criteria, that is, the position criteria and the dimension criteria. Thus, for example, all the residual pulses for which the width is less than a predetermined percentage of the mean width of a horizontal synchronization pulse are eliminated and each residual pulse not eliminated is assigned a first mark according to its width. The highest first mark corresponds, for example, to a pulse for which the width is equal to the mean width.

Furthermore, the temporal gap between each residual pulse not eliminated and the transition of the reference signal is determined. Each residual pulse not eliminated is then assigned a second mark. The highest second mark corresponds, for example, to a pulse attributed to a zero temporal gap.

Each residual pulse not eliminated is then assigned a final mark resulting from a predetermined weighting between the first mark and the second mark. The residual pulse bearing the highest final mark is then selected.

The weighting can change depending on the applications, to adapt in particular to various types of video sources as well as to the quality of this video signal. Thus, in the presence of a significant noise level, the position criteria will be favored over the dimension criteria whereas, when there is little noise, the dimension criteria will be favored over the position criteria. Similarly, when the video source is a video tape recorder, for example, this will very probably give rise to an end-of-field phase jump, and at that moment the width of the synchronization pulses will be favored over their position.

In terms of hardware, the video circuit CVD according to the invention may comprise on the same silicon chip the horizontal synchronization means MSH shown in FIG. 4. Thus, the analog-to-digital converter ADC is followed by a low-pass filter LPF. The cut-off frequency of this low-pass filter typically lies between 200 kHz and 2 MHz, and preferably between 500 kHz and 1 MHz. With this type of filter, a significant part of the noise and of the chrominance subcarrier can be eliminated.

The filtered sampled signal SNF is then delivered to thresholding means MSE which performs a thresholding of the signal so as to eliminate any part of the signal SNF for which the level is above a threshold. This threshold is for example on the order of 50% of the measured mean amplitude of a horizontal synchronization pulse. The digital signal SNS subjected to the threshold consequently includes residual pulses which are considered as being potential horizontal synchronization pulses.

Selection means MSL will then select a pulse IMPS which will be considered as being the horizontal synchronization pulse. This pulse IMPS will then be delivered to the phase-locked loop PLL comprising the phase comparator CMPH followed by the loop filter FB and the controllable oscillator OSC delivering the reference signal SRF.

This signal SRF is furthermore fed back to the phase comparator CMPH and also to the selection means, to enable selection according to a predetermined criteria. The oscillator is therefore, in this embodiment, controlled via the loop filter FB by the error signal ERR representative of the phase gap between the selected pulse IMPS and a transition of the signal SRF.

The invention claimed is:

1. A method for detecting parity of successive fields of an interlaced video signal comprising:
   determining successive values of a horizontal phase of the interlaced video signal at a predetermined integer number of video lines after successive occurrences of vertical synchronization pulses;
   updating successive values of a parity bit according to the successive values of the horizontal phase; and
   providing indications on the parity of the successive fields of the interlaced video signal from the updated successive values of the parity bit.

2. A method according to claim 1, further comprising:
   setting a parity counter to zero;
   changing a current value of an arbitrary parity bit on each occurrence of a vertical synchronization pulse;
   comparing the current value of the arbitrary parity bit with the value of the parity bit determined at a previous field; and
   incrementing or decrementing the parity counter based upon the comparing, the parity indication of a current field being the current value of the arbitrary parity bit or a complement of the current value of the arbitrary parity bit based upon a sign of a current value of the parity counter.

3. A method according to claim 2, wherein the parity counter has a positive counting-stop value and a negative counting-stop value; and further comprising:
   not modifying the value of the parity counter when the negative counting-stop value is reached and a decrement command is received; and
   not modifying the value of the parity counter when the positive counting-stop value is reached and an increment command is received.

4. A method according to claim 2, wherein the parity counter is reset to zero on each loss of vertical synchronization.

5. A method for operating a video circuit comprising:
   converting an interlaced analog video signal to an interlaced digital video signal;
   horizontally synchronizing a reference signal with the interlaced digital video signal;
   generating vertical synchronization pulses based upon the interlaced digital video signal;
   detecting parity of successive fields of the interlaced digital video signal by
      determining successive values of a horizontal phase of the interlaced digital video signal at a predetermined integer number of video lines after successive occurrences of vertical synchronization pulses,
      updating successive values of a parity bit according to the successive values of the horizontal phase, and providing indications on the parity of the successive fields of the interlaced digital video signal from the updated successive values of the parity bit.

6. A method according to claim 5, wherein providing indications on the parity further comprises:
setting a parity counter to zero;
changing a current value of an arbitrary parity bit on each occurrence of a vertical synchronization pulse;
comparing the current value of the arbitrary parity bit with the value of the parity bit determined at a previous field; and
incrementing or decrementing the parity counter based upon the comparing, the parity indication of a current field being the current value of the arbitrary parity bit or a complement of the current value of the arbitrary parity bit based upon a sign of a current value of the parity counter.

7. A method according to claim 6, wherein the parity counter has a positive counting-stop value and a negative counting-stop value; and further comprising:
not modifying the value of the parity counter when the negative counting-stop value is reached and a decrement command is received; and
not modifying the value of the parity counter when the positive counting-stop value is reached and an increment command is received.

8. A method according to claim 6, wherein the parity counter is reset to zero on each loss of vertical synchronization.

9. A device for detecting parity of successive fields of an interlaced video signal, the device comprising:
determination means for determining successive values of a horizontal phase of the interlaced video signal at a predetermined integer number of video lines after successive occurrences of vertical synchronization pulses;
updating means connected to said determination means for updating successive values of a parity bit according to the successive values of the horizontal phase; and
processing means connected to said updating means for providing indications on the parity of the successive fields of the interlaced video signal from the updated successive values of the parity bit.

10. A device according to claim 9, further comprising counting means connected to said determination means for counting the predetermined integer number of video lines after each occurrence of a vertical synchronization pulse and for delivering an end-of-counting signal; and wherein said determination means is responsive to the end-of-counting signal.

11. A device according to claim 9, further comprising a first register connected between said updating means and said processing means for storing the parity bits.

12. A device according to claim 9, wherein said processing means comprises:
a parity counter initially set to zero;
a second register for storing an arbitrary parity bit;
changing means connected to said second register for changing a current value of the arbitrary parity bit at each occurrence of a vertical synchronization pulse;
comparison means connected between said second register and said parity counter for comparing the current value of the arbitrary parity bit with a value of the parity bit determined at a previous field; and
control means connected to said comparison means for incrementing or decrementing said parity counter based upon the comparing, the parity indication of a current field being the current value of the arbitrary parity bit or a complement of the current value of the arbitrary parity bit based upon a sign of a current value of said parity counter.

13. A device according to claim 12, wherein said parity counter has a positive counting-stop value and a negative counting-stop value; and wherein said control means:
does not modify the value of said parity counter when the negative counting-stop value is reached and a decrement command is received; and
does not modify the value of said parity counter when the positive counting-stop value is reached and an increment command is received.

14. A device according to claim 12, wherein said control means resets said parity counter to zero on each loss of vertical synchronization.

15. A device according to claim 9, further comprising horizontal synchronization means for horizontally synchronizing a reference signal with the interlaced video signal, said horizontal synchronization means comprising a digital phase-locked loop comprising:
a low-pass filter; and
a controllable oscillator connected to said low-pass filter for providing the reference signal.

16. A device according to claim 9, wherein said counting means comprises a counter that is incremented in synchronization with a clock signal, and said counter provides the end-of-counting signal when a counting value corresponds to a product of the predetermined integer number of video lines and a mean duration of a video signal.

17. A device according to claim 9, further comprising a substrate, and wherein said determination means, said updating means and said processing means are on said substrate so that the device is an integrated circuit.

18. A video circuit comprising:
a detection device for detecting parity of
successive fields of an interlaced video signal, said detection device comprising
a determination circuit for determining successive values of a horizontal phase of the interlaced video signal at a predetermined integer number of video lines after successive occurrences of vertical synchronization pulses,
an updating circuit connected to said determination circuit for updating successive values of a parity bit according to the successive values of the horizontal phase, and
a processing circuit connected to said updating circuit for providing indications on the parity of the successive fields of the interlaced video signal from the updated successive values of the parity bit.

19. A video circuit according to claim 18, wherein the interlaced video signal is an analog video signal; and further comprising:
an analog-to-digital converter for converting the analog video signal to a digital video signal; and
a horizontal synchronization circuit connected to said analog-to-digital converter for horizontally synchronizing a reference signal with the digital video signal, said horizontal synchronization circuit comprising a digital phase-locked loop comprising
a low-pass filter, and
a controllable oscillator connected to said loop filter for providing the reference signal.

20. A video circuit according to claim 19, wherein said horizontal synchronization circuit further comprises:

a threshold circuit connected to said low-pass filter for leaving horizontal synchronization pulses having a level less than a threshold; and a selection circuit connected to said threshold circuit for selecting among residual pulses inside an observation window based upon each transition of the reference signal pulses corresponding to the horizontal synchronization pulse.

21. A video circuit according to claim 18, further comprising a vertical synchronization circuit for generating vertical synchronization pluses based upon the interlaced video signal.

22. A video circuit according to claim 18, wherein said detection circuit further comprises a counter connected to said determination circuit for counting the predetermined integer number of video lines after each occurrence of a vertical synchronization pulse and for delivering an end-of-counting signal; and wherein said determination circuit is responsive to the end-of-counting signal.

23. A video circuit according to claim 18, wherein said detection circuit further comprises a first register connected between said updating circuit and said processing circuit for storing the parity bits.

24. A video circuit according to claim 18, wherein said processing circuit comprises:

a parity counter initially set to zero;

a second register for storing an arbitrary parity bit;

a changing circuit connected to said second register for changing a current value of the arbitrary parity bit at each occurrence of a vertical synchronization pulse;

a comparison circuit connected between said second register and said parity counter for comparing the current value of the arbitrary parity bit with a value of the parity bit determined at a previous field; and a control circuit connected to said comparison circuit for incrementing or decrementing said parity counter based upon the comparing, the parity indication of a current field being the current value of the arbitrary parity bit or a complement of the current value of the arbitrary parity bit based upon a sign of a current value of said parity counter.

25. A video circuit according to claim 24, wherein said parity counter has a positive counting-stop value and a negative counting-stop value; and wherein said control circuit:

does not modify the value of said parity counter when the negative counting-stop value is reached and a decrement command is received; and does not modify the value of said parity counter when the positive counting-stop value is reached and an increment command is received.

26. A video circuit according to claim 24, wherein said control circuit resets said parity counter to zero on each loss of vertical synchronization.

27. A video circuit according to claim 22, wherein said counter is incremented in synchronization with a clock signal, and said counter provides the end-of-counting signal when a counting value corresponds to a product of the predetermined integer number of video lines and a mean duration of a video signal.

* * * * *